(12) United States Patent
Jones

(10) Patent No.: US 12,480,666 B2
(45) Date of Patent: Nov. 25, 2025

(54) HEAT RECLAMATION SYSTEM WITHIN A COOLING TOWER FOR A MANUFACTURING FACILITY

(71) Applicant: William Jones, East Grand Rapids, MI (US)

(72) Inventor: William Jones, East Grand Rapids, MI (US)

( * ) Notice: Subject to any disclaimer, the term of this patent is extended or adjusted under 35 U.S.C. 154(b) by 433 days.

(21) Appl. No.: 18/260,136

(22) PCT Filed: Sep. 15, 2021

(86) PCT No.: PCT/IB2021/058410
§ 371 (c)(1),
(2) Date: Jun. 30, 2023

(87) PCT Pub. No.: WO2022/064326
PCT Pub. Date: Mar. 31, 2022

(65) Prior Publication Data
US 2024/0068674 A1    Feb. 29, 2024

Related U.S. Application Data

(60) Provisional application No. 63/089,133, filed on Oct. 8, 2020, provisional application No. 63/082,863, filed on Sep. 24, 2020.

(51) Int. Cl.
*F24F 1/0018* (2019.01)

(52) U.S. Cl.
CPC .................................. *F24F 1/0018* (2013.01)

(58) Field of Classification Search
CPC ..... F24F 1/0018; F28C 1/12; F28C 2001/006; Y02P 80/10

USPC .......................................................... 165/121
See application file for complete search history.

(56) References Cited

U.S. PATENT DOCUMENTS

| | | | | |
|---|---|---|---|---|
| 4,478,767 | A | * | 10/1984 | Watanabe ................ F28C 1/00 261/36.1 |
| 2013/0075066 | A1 | * | 3/2013 | Reytblat ................... F28C 1/14 165/121 |
| 2015/0143826 | A1 | * | 5/2015 | Lingelbach ........... F25B 47/022 62/81 |
| 2018/0202671 | A1 | * | 7/2018 | Martin ...................... F28B 9/06 |
| 2019/0301819 | A1 | * | 10/2019 | Nagata .................... F28F 19/01 |

FOREIGN PATENT DOCUMENTS

| | | |
|---|---|---|
| CN | 208983889 U | 6/2019 |
| RU | 2425313 C2 | 7/2011 |
| RU | 2511784 C2 | 4/2014 |
| RU | 193755 U1 | 11/2019 |

\* cited by examiner

*Primary Examiner* — Steve S Tanenbaum
(74) *Attorney, Agent, or Firm* — Price Heneveld LLP (57) ABSTRACT

An industrial heat exchange system includes a cooling tower having an exterior wall and a top aperture. An exhaust fan is positioned near the top aperture. A mixing space of the cooling tower is positioned below the exhaust fan. An ambient air inlet extends through the exterior wall for providing outside air into the mixing space. A manufacturing air inlet extends through the exterior wall for providing heated air into the mixing space. The outside air and the heated air combine within the mixing space to define control air that is maintained above a minimum temperature. The heated air is delivered through an air duct extending from a manufacturing facility to the manufacturing air inlet.

20 Claims, 5 Drawing Sheets

HEAT RECLAMATION SYSTEM WITHIN A COOLING TOWER FOR A MANUFACTURING FACILITY

FIELD OF THE DISCLOSURE

The present disclosure generally relates to cooling towers, and more specifically, a heat reclamation system for a cooling tower of a manufacturing facility.

BACKGROUND OF THE DISCLOSURE

During operation of a manufacturing facility, a cooling tower is utilized for providing a thermal exchange system to cool fluid media that is used during various manufacturing processes. During times of cooler outside temperatures, these cooling towers can accumulate frost and ice such that cooling capability becomes diminished and the cooling tower potentially inoperable.

SUMMARY OF THE DISCLOSURE

According to at least one aspect of the present disclosure, an industrial heat exchange system includes a cooling tower having an exterior wall and a top aperture. An exhaust fan is positioned near the top aperture. A mixing space of the cooling tower is positioned below the exhaust fan. An ambient air inlet extends through the exterior wall for providing outside air into the mixing space. A manufacturing air inlet extends through the exterior wall for providing heated air into the mixing space. The outside air and the heated air combine within the mixing space to define control air that is maintained above a minimum temperature. The heated air is delivered through an air duct extending from a manufacturing facility to the manufacturing air inlet.

According to another aspect of the present disclosure, an industrial heat exchange system includes a cooling tower having an exterior wall and a top aperture. An exhaust fan is positioned within the exterior wall. At least one mixing space is positioned upstream of the exhaust fan. A manufacturing air inlet extends through the exterior wall for providing heated air into the at least one mixing space. An ambient air inlet is in communication with at least the heated air for selectively providing outside air into the at least one mixing space. The outside air and the heated air combine within the at least one mixing space to define control air that is maintained above a minimum temperature. The heated air is delivered through an air duct extending from a manufacturing facility to the manufacturing air inlet.

According to yet another aspect of the present disclosure, an industrial heat exchange system includes a cooling tower having an exterior wall and a top aperture. An exhaust fan is positioned proximate the top aperture. At least one mixing space is positioned within the exterior wall and upstream of the exhaust fan. A manufacturing air inlet extends through the exterior wall for providing heated air that is expelled from mechanical equipment. The heated air is directed into the at least one mixing space. An ambient air inlet is in communication with at least the heated air for selectively providing outside air into the at least one mixing space. The outside air and the heated air combine within the at least one mixing space to define control air that is maintained above a minimum temperature. The heated air is delivered through an air duct extending from a manufacturing facility to the manufacturing air inlet.

According to one aspect of the present disclosure, a method for providing cooling to manufacturing mechanisms includes capturing heat from within a manufacturing facility to define a heated recirculating media. The heated recirculating media is delivered to a cooling tower. Ambient air is introduced to a mixing space of the cooling tower. Heated air is added from the manufacturing facility into the mixing space. The heated air is mixed with the ambient air to define control air having a predetermined temperature. An exhaust fan of the cooling tower is operated to draw the control air through the cooling tower. The heated recirculating media is cooled using the control air to define a cooled recirculating media. The cooled recirculating media is delivered to machinery of the manufacturing facility.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
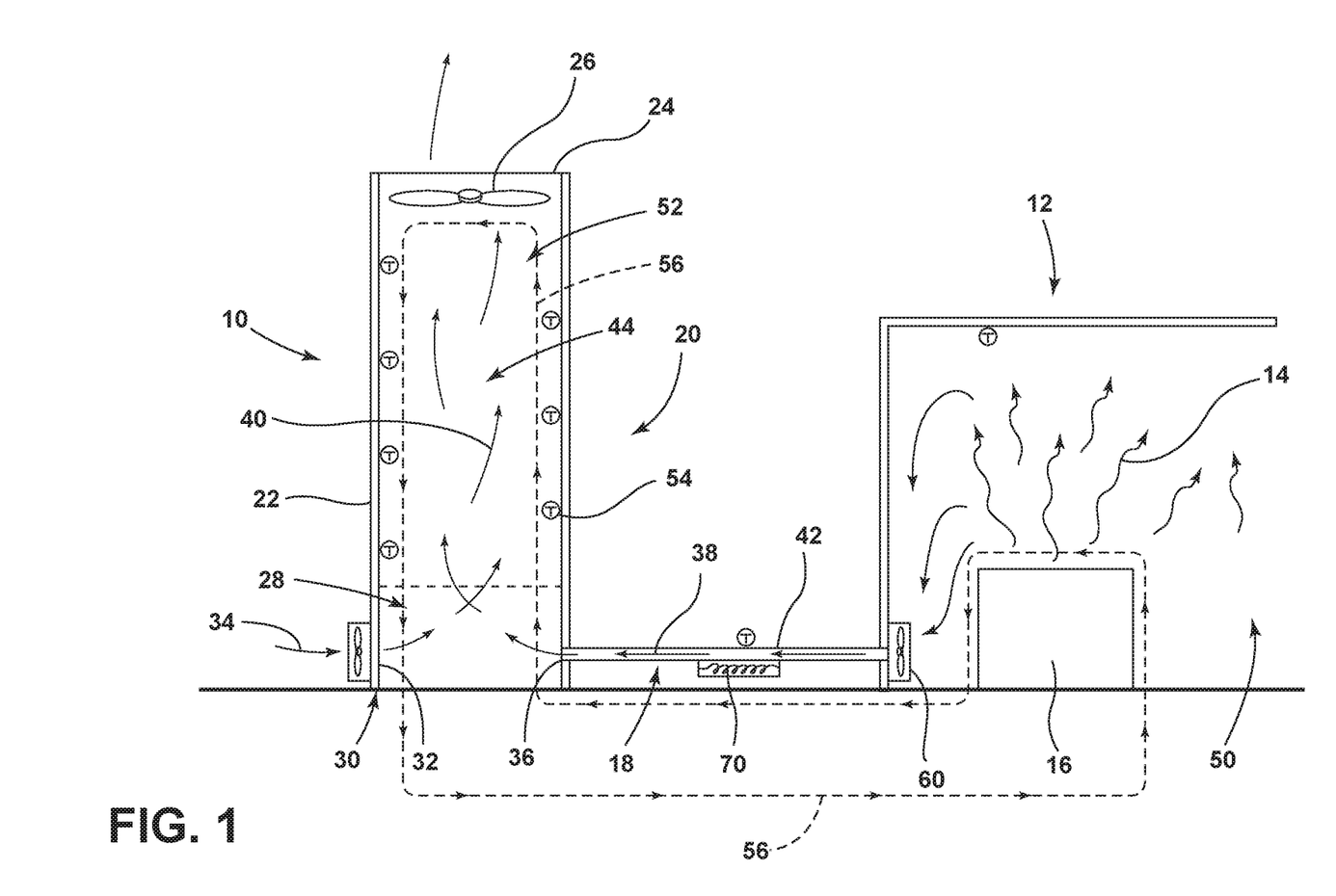
FIG. 1 is a cross-sectional view of an exemplary industrial cooling tower that is in thermal communication with a manufacturing facility from which heat is reclaimed for operating the industrial cooling tower.
Figure 2:
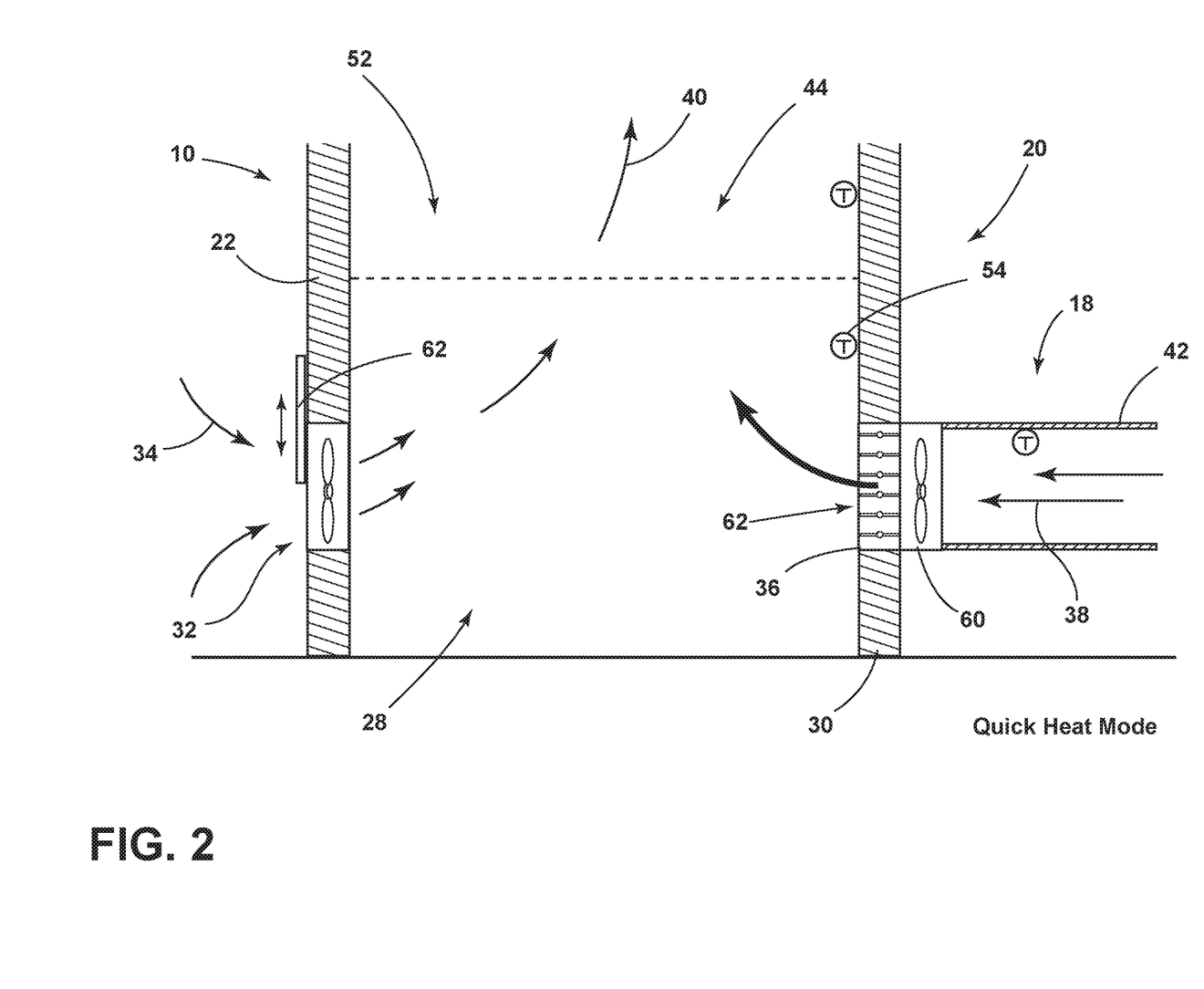
FIG. 2 is a detail schematic view of an aspect of the ambient air inlet and the manufacturing air inlet for the industrial cooling tower and showing movement of outside air and heated air within the mixing space of the cooling tower.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cooling tower for cooling a recirculating media that operates using recaptured heat for minimizing freezing during use of the cooling tower. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As exemplified in FIGS. 1-5, reference numeral 10 generally refers to a cooling tower, typically evaporative cooling towers, used in connection with a manufacturing facility 12. Heat 14 from the manufacturing facility 12 is generated during operation of various machinery 16 and processes. This heat 14 can be reclaimed through operation of an air handling system 18 that extends between the manufacturing facility 12 and the cooling tower 10. According to various aspects of the device, an industrial heat exchange system 20 includes the cooling tower 10 having an exterior wall 22 and a top aperture 24. An exhaust fan 26 is positioned near the top aperture 24. At least one mixing space 28 of the cooling tower 10 is positioned upstream of the exhaust fan 26, typically below the exhaust fan 26 and near a base 30 of the cooling tower 10. An ambient air inlet 32 extends through the exterior wall 22 for providing cooler outside air 34 into the one or more mixing spaces 28. A manufacturing air inlet 36 extends through the exterior wall 22 for providing heated air 38 into the mixing space 28 and from the manufacturing facility 12. The outside air 34 and heated air 38 combine within the one or more mixing spaces 28 to define control air 40 that can be maintained above a minimum temperature. The heated air 38 is delivered through an air duct 42 for the air handling system 18. The air duct 42 extends from the manufacturing facility 12 and to the manufacturing air inlet 36.

Referring again to FIGS. 1-4, it is contemplated that the industrial heat exchange system 20 can be used within a wide range of configurations of cooling towers 10. In addition, FIG. 1 shows an exhaust fan 26 that operates vertically to move the control air 40 through a cooling chamber 44 of the cooling tower 10 and the top aperture 24. In addition, other fan types and configurations can be incorporated. Such fan types and configurations can include, but are not limited to, centrifugal fans, radial blowers, in-line blowers, axial fans, combinations thereof and other similar configurations. It should also be understood that a single fan and/or a plurality of fans can be utilized as the exhaust fan 26 for moving the control air 40 through the cooling tower 10. The exhaust fan 26 can be used to move the control air 40 in various directions through the cooling chamber 44 of the cooling tower 10, such as vertical, centrifugal, cyclonic and directional combinations thereof.

As exemplified in FIG. 1, during operation of the manufacturing facility 12, various amounts of heat 14 is generated within the building envelope of this manufacturing facility 12. In order to reclaim this heat 14, the air handling system 18 for the cooling tower 10 can be activated for delivering this heated air 38 from the interior 50 of the manufacturing facility 12 and through the air duct 42. This heated air 38 is moved through the air duct 42 and then through the manufacturing air inlet 36 of the cooling tower 10. Within the mixing space 28 of the cooling tower 10, the heated air 38 and the cooler outside air 34 are combined. The resulting control air 40 can be regulated to ensure that the environment 52 within the cooling chamber 44 of the cooling tower 10 is maintained above the minimum temperature.

According to the various aspects of the device, the exhaust fan 26 is a variable frequency drive (VFD) fan that can be controlled by key statistics measured in the discharge fluid that is cooled within the cooling tower 10 and returned to the manufacturing facility 12. In this manner, one parameter for determining the desired flow of control air 40 to be moved through cooling tower 10 is the volume of control air 40. In certain instances, an increase or decrease in the volume of control air 40 may be required. Conversely, in more extreme colder temperatures, it may be possible or desired to turn the exhaust fan 26 off. In such instances, the latent temperature of the environment 52 within the cooling tower 10 may be sufficient to provide the proper exchange of heat 14. Another control parameter for the cooling tower 10 and the control air 40 is the temperature of the control air 40. More particularly, the proportion of outside air 34 and heated air 38 are combined within the mixing space 28 to generate the desired control air 40.

Often, it is the case that the factors affecting these parameters (volume of control air 40 and temperature of control air 40) are continually changing due to weather changes, the time of day, seasonal changes, changes within the manufacturing facility 12, changes in the availability of heat 14, and other variables. The design of the cooling tower 10 and the heat exchange system 20 described herein are continually and automatically adjustable in real time to change in response to the factors affecting the various parameters. This serves to maintain the cooling tower 10 and the control air 40 within the desired operating parameters.

The cooling tower 10 is typically used for cooling various fluid recirculating media 56, such as air or liquids. This recirculating media 56 receives heat 14, in the form of heated air 38 and/or heated fluid, that is generated within and expelled from mechanical equipment located within the manufacturing facility 12. This recirculating media 56 is delivered to the cooling tower 10 and cooled within a cooling chamber 44 defined within the cooling tower 10. The now cooled recirculating media 56 can then be returned to the manufacturing facility 12 for lowering the temperature of certain components of various manufacturing process. This process can continue as the recirculating media 56 is recirculated between the cooling tower 10 and the manufacturing facility 12.

In certain examples, the cooling tower 10 can be utilized for producing cooled liquid in lieu of mechanical refrigeration, that is then used for cooling products formed during various plastic molding or metal forming processes. In order to provide this cooling function within the cooling tower 10, it is necessary that frosting and freezing within the cooling tower 10 is prevented. Accordingly, within the cooling tower 10, a thermostat 54 or, more typically, a plurality of thermostats 54 can be positioned at locations within and around the cooling tower 10 to monitor the temperature of the interior environment 52 for the cooling tower 10 and the air moving therethrough.

Referring again to FIGS. 1-4, where the air inside the cooling tower 10 approaches this minimum temperature, the air handling system 18 for the heat exchange system 20 can be activated. Once activated, heated air 38 from the manufacturing facility 12 can be moved through the air duct 42 and into the manufacturing air inlet 36 to be combined with outside air 34 within the mixing space 28. Typically, the at least one mixing space 28 is positioned upstream of the cooling tower 10 and the exhaust fan 26. The resulting control air 40 which is typically warmer than the outside air 34 and the existing air within the cooling tower 10 warms the inside of the cooling tower 10 so that the temperature of the cooling tower 10 is maintained above the minimum temperature.

Depending upon the amount of heated air 38 that is required to be moved into the mixing space 28, the air handling system 18 can include a variable speed reclaim fan 60 for moving greater or lesser amounts of the heated air 38 into the mixing space 28. In addition, various baffles, louvers, or other airflow devices 62 can be installed at the ambient air inlet 32 as well as the manufacturing air inlet 36 or other portion of the air handling system 18 for controlling the amount of outside air 34 as well as heated air 38 that is moved into the mixing space 28. It is contemplated that the ambient air inlet 32 may also include a fan. Typically, the ambient air inlet 32 will not include a fan.

Figure 4:
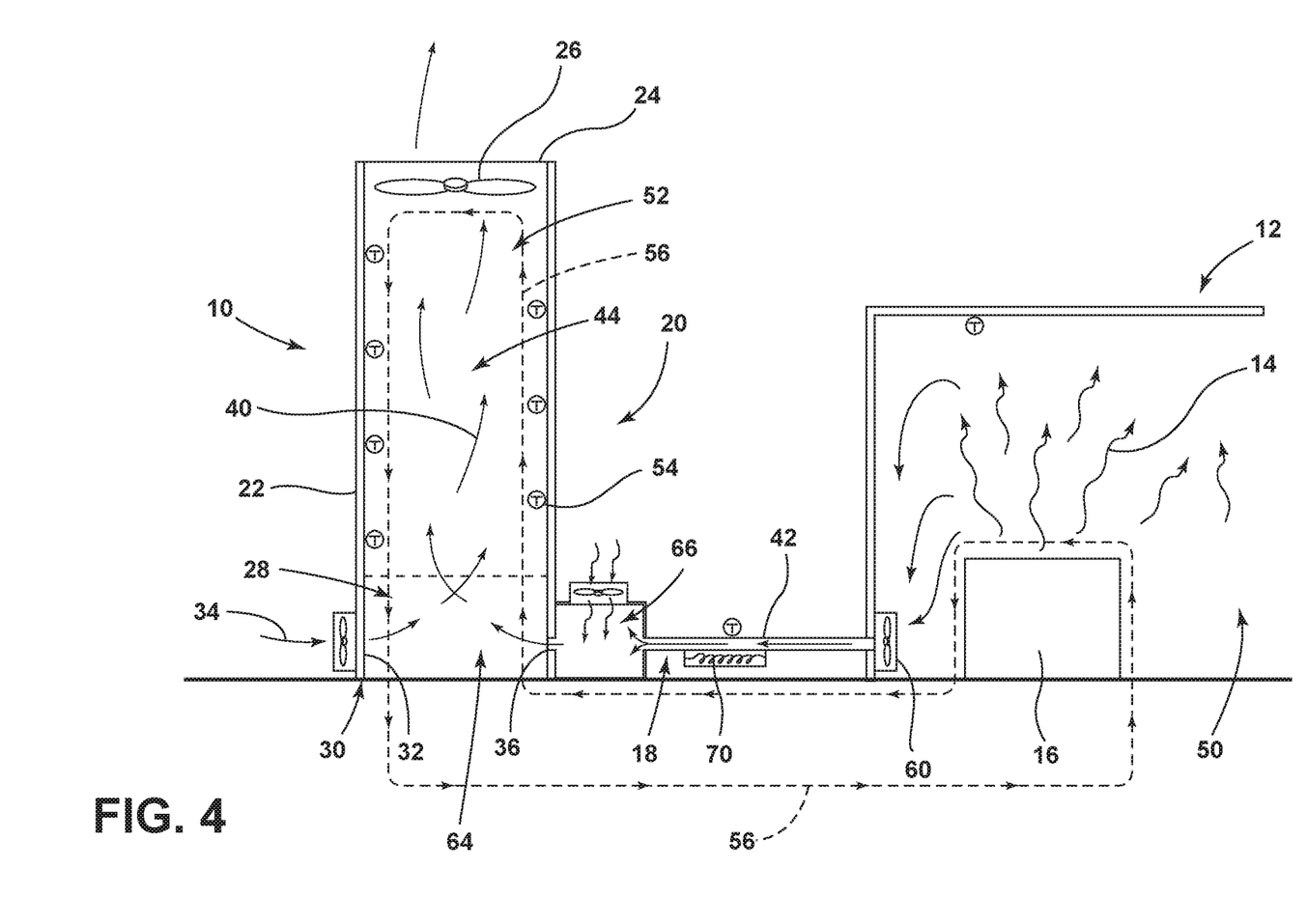
FIG. 4 is cross-sectional view of an exemplary industrial cooling tower that is in thermal communication with a manufacturing facility and showing internal and external mixing spaces for delivering control air into the cooling tower.
Figure 5:
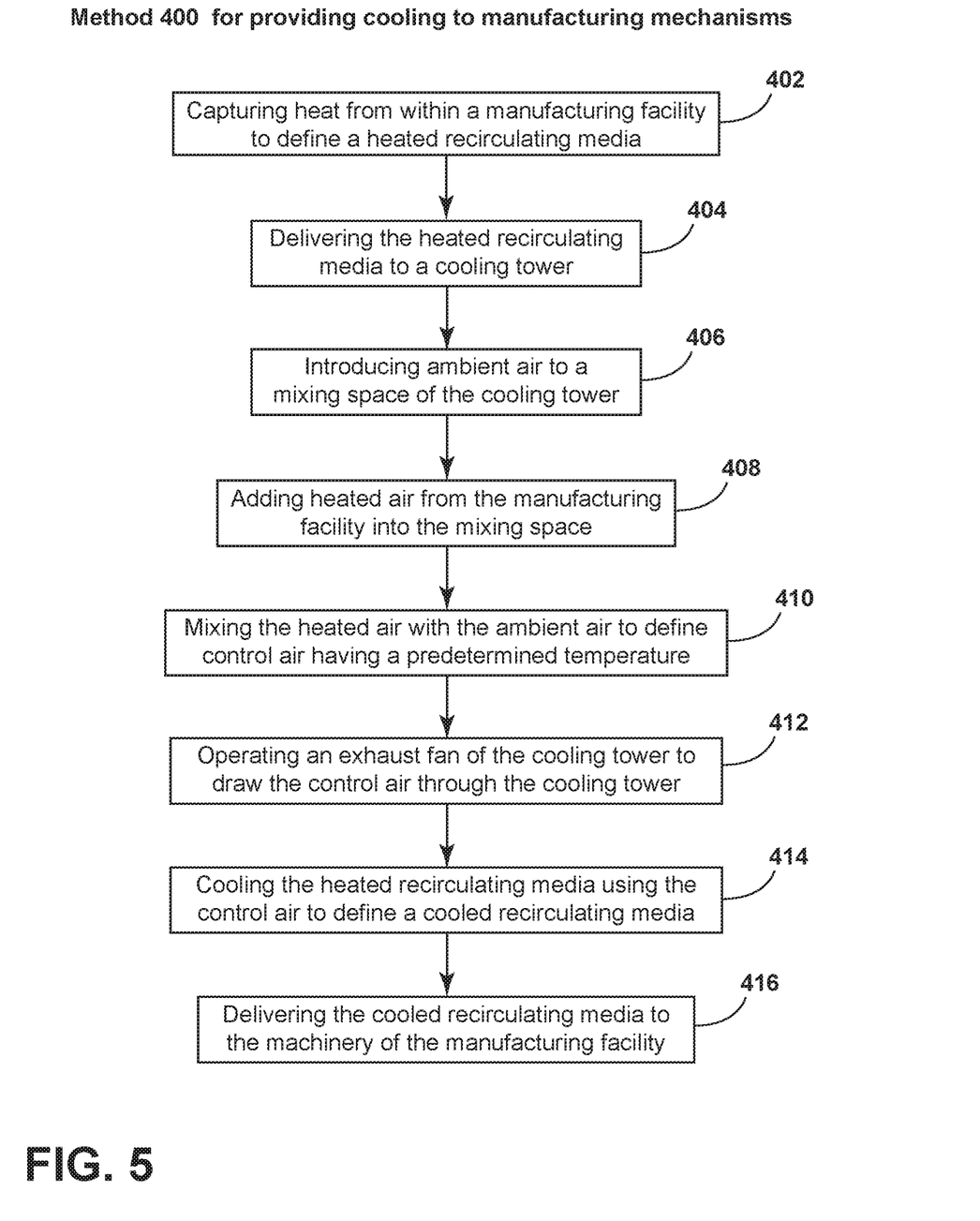
FIG. 5 is a schematic flow diagram illustrating a method for cooling a recirculating media using an aspect of the cooling tower and air handling system.

In certain aspects of the device, as exemplified in FIG. 4, the mixing space 28 for mixing the heated air 38 and the outside air 34 can be located external to the cooling tower 10. Such an external mixing space 28 can be used where it is desirable to only introduce control air 40 into the cooling tower 10. It may also be desirable to prevent the direct introduction of outside air 34 into the cooling tower 10. The external mixing space 28 can be within a portion of the air duct 42 from the manufacturing facility 12. The external mixing space 28 can also be a separate and dedicated chamber that houses the mixing space 28. This separate chamber may be attached to the cooling tower 10 or may be a separate structure set apart from the cooling tower 10. In certain aspects of the device, the cooling tower 10 may include two mixing spaces 28. An internal or first mixing space 64 may be located within the cooling tower 10, typically below the cooling chamber 44, and an external or second mixing space 66 may be separated from the cooling tower 10 or be located outside of the exterior wall 22 for the cooling tower 10. These separate first and second mixing spaces 64, 66 can be activated and deactivated depending on the specific needs for the control air 40 to be introduced into the cooling tower 10.

Where a significant amount of heat 14 is required within the cooling tower 10, it may be necessary to close the ambient air inlet 32 to provide only heated air 38 through the manufacturing air inlet 36. Conversely, airflow devices 62 within the manufacturing air inlet 36 and/or the air duct 42 may be operated to provide varying amounts of heated air 38 into the mixing space 28. The various thermostats 54 are typically placed in communication with the air handling system 18 and the ambient air inlet 32 to provide finite adjustment and responsiveness to the current temperature and environment 52 within and around the cooling tower 10, as well as within the manufacturing facility 12.

According to various aspects of the device, the cooling tower 10 can also recapture resources from the manufacturing facility 12 by recovering fluids that are used during the operation of the facility 12. These fluids may contain heat 14 generated during operation of the facility 12. These fluids can be delivered to the cooling tower 10 through fluid spray system that injects a spray of fluid into the cooling tower 10. These fluid sprays can be injected at or near the exhaust fan 26, and typically below the exhaust fan 26. In certain conditions, to avoid freezing within the cooling tower 10, the fluid spray can be in the form of a heated fluid that is sprayed or otherwise injected into the cooling tower 10. Also, to provide additional cooling capacity, the fluid spray system can inject a spray of cooled fluid into the cooling tower 10. The fluid spray system can be used in conjunction with other components that can include, but are not limited to, drift eliminators, fluid distribution devices, wet decks, combinations thereof and other similar devices.

In addition, to prevent freezing and icing throughout the height of the cooling tower 10, supplemental manufacturing air inlets 36 can be positioned between the exhaust fan 26 and the fluid spray system. The supplemental manufacturing air inlets 36 provide for the delivery of heated air 38 from the facility 12 to a position near the top aperture 24. This addition of heated air 38 prevents icing at the exhaust fan 26 and the top aperture 24. As the control air 40 is drawn upward through the cooling tower 10, the control air 40 can decrease in temperature. The supplemental manufacturing air inlets 36 can be positioned near the exhaust fan 26 to allow for a selective delivery of heated air 38. The selective addition of heated air 38 helps to maintain the control air 40 at a relatively consistent temperature as the control air 40 moves through the cooling tower 10.

It is contemplated that the supplemental manufacturing air inlets 36 can be positioned at various positions along the height of the cooling tower 10. Each of the supplemental manufacturing air inlets 36 can include an airflow device 62 that regulates the delivery of heated air 38 into the cooling tower 10. These airflow devices 62 can be coupled with the various thermostats 54 and a controller for managing the position of the airflow devices 62 and maintaining the temperature of the control air 40 within the cooling tower 10. As discussed above, the supplemental manufacturing air inlets 36 will typically be located at a position above the fluid spray system and below the exhaust fan 26.

Because the manufacturing facility 12 produces heat 14 as a result of its typical operation, reclaiming this heat 14 is a cost-effective way of providing heat 14 to the cooling tower 10 to prevent frosting, freezing or other temperature-related phenomenon from diminishing the performance of the cooling tower 10.

In various aspects of the device, the air handling system 18 that provides heated air 38 to the manufacturing facility 12 can also include various pre-heaters 70 that may be electrical or gas-powered. These pre-heaters 70 can be used to heat air that is within the air duct 42 or maintain the air within the air duct 42 at a certain temperature for providing to the mixing space 28. It is contemplated that the pre-heater 70 may be typically used during an initial phase of operation for the air handling system 18. Once heated air 38 from the manufacturing facility 12 is moved continuously through the air duct 42, the pre-heater 70 may be deactivated and the heated air 38 from the manufacturing facility 12, on its own, can provide sufficient heating to the mixing space 28 and the cooling tower 10. In various aspects of the device, the pre-heaters 70 can also recover heat 14 from the manufacturing facility 12. In various non-limiting examples, the pre-heater 70 may be a heat sink that stores heat 14 for use during the initial phase of operation of the air handling system 18. This configuration further maximizes the recapture of heat 14 from the manufacturing facility 12.

In certain aspects of the device, the cooling tower 10 may require additional amounts of heat 14 for generating the appropriate control air 40 for operating the cooling tower 10. This additional heat 14 may be provided through a third party source. This third party heat 14 can be provided by or purchased from a separate manufacturing facility 12 and other third party sources. In certain conditions, such a third party source of heat 14 may be the primary or sole source of heat 14 and heated air 38 for the cooling tower 10. It is contemplated that the cooling capacity generated through operation of the cooling tower 10 can be provided to third party manufacturing facilities 12 and other third party consumers.

Figure 3:
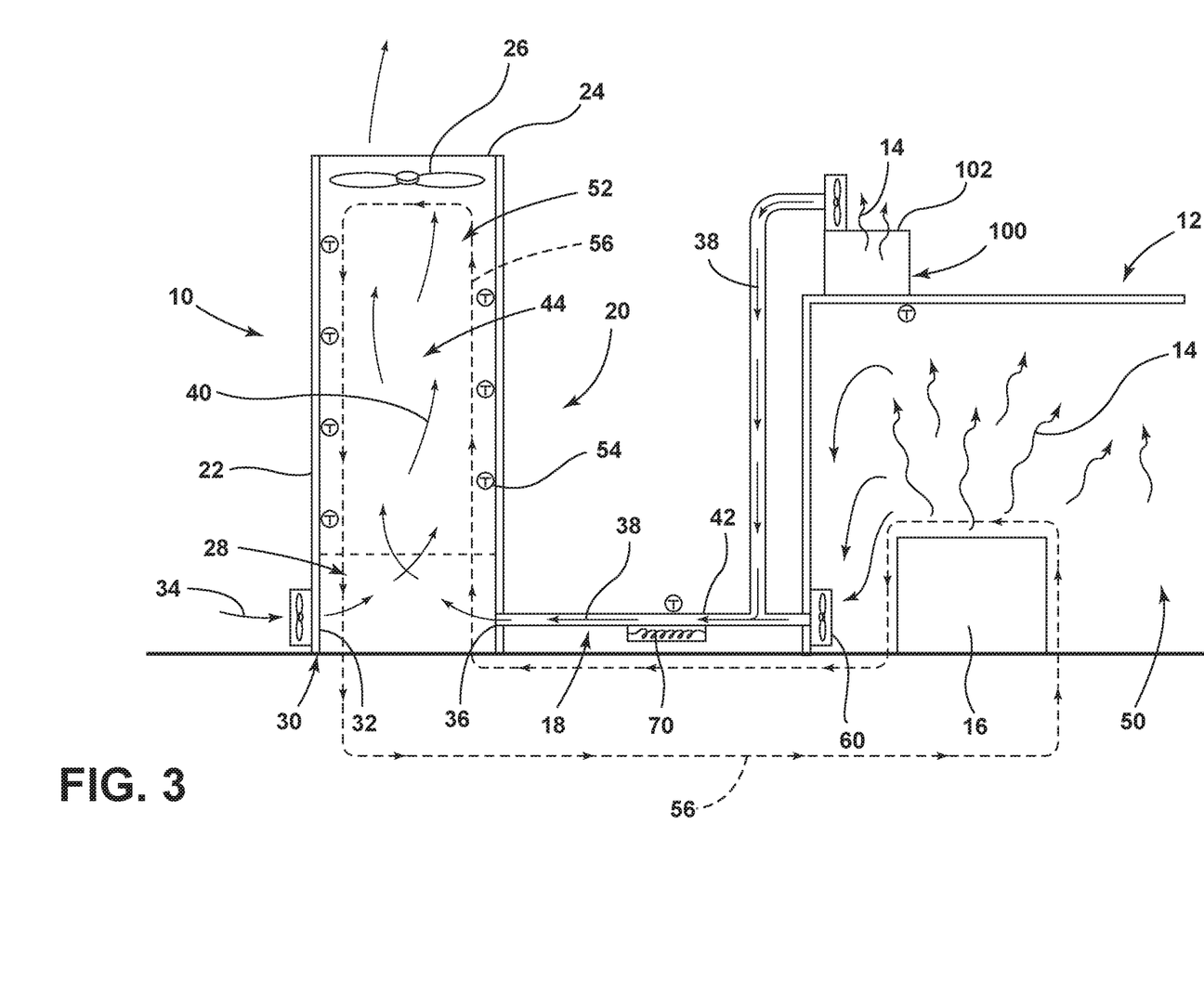
FIG. 3 is a cross-sectional view of an exemplary industrial cooling tower that is in thermal communication with a manufacturing facility from which heat is reclaimed for operating the industrial cooling tower, and reflecting collection of heat from additional sources for delivery to the mixing space.

According to various aspects of the device, as exemplified in FIGS. 3 and 4, certain geographic locations and seasons have less water and other liquids available for use. In these conditions, it is contemplated that the cooling provided by the air handling system 18 and the cooling tower 10 can be entirely provided by air. In these conditions, fluid, such as water, may be the recirculating media 56, where the recirculating media 56 is conserved within the cooling tower 10 and the manufacturing facility 12. The air handling system 18 can operate to cool the recirculating media 56 entirely by delivering excess heat 14 from the manufacturing facility 12 to the cooling tower 10 using heated air 38. This excess heat 14 may be from locations unrelated to the manufacturing processes and machinery that are cooled using the recirculating media 56. Other machinery, such as condenser 102 for air conditioning units 100, and other heat-generating mechanisms can be used as sources of heat 14. In addition, where freezing of the cooling tower 10 is possible, recovered heat 14 from the machinery of the manufacturing facility 12 and heat 14 from condensers 102 can be used to increase the temperature of the control air 40 to maintain the environment 52 of the cooling tower 10 within a desired range. It is also contemplated that the recirculating media 56 can be a different fluid media other than water.

Referring now to FIGS. 1-5, having described various aspects of the device, a method 400 is disclosed for providing cooling for manufacturing mechanisms within a manufacturing facility 12 using a recirculating media 56, the cooling tower 10 and the air handling system 18. According to the method 400, step 402 includes capturing heat 14 from machinery within a manufacturing facility 12 to define the heated recirculating media 56. Typically, the recirculating media 56 is in the form of a thermal exchange media, such as water, air, glycol, combinations thereof and other similar thermal exchange media. The heated recirculating media 56 is then delivered to the cooling tower 10 (step 404). At the same time, the air handling system 18 introduces ambient air into a mixing chamber (step 406). Heated air 38 from the manufacturing facility 12 is also added to the mixing chamber (step 408). By adding the ambient air and the heated air 38 into the mixing chamber, the control air 40 is created within the mixing chamber (step 410). This control air 40 is formulated to have a desired or predetermined temperature. Accordingly, the air handling system 18 can operate to control an amount and proportion of heated air 38 and ambient air to arrive at the desired temperature of control air 40.

Referring again to FIGS. 1-5, after the control air 40 is prepared, the exhaust fan 26 is operated to draw the control air 40 through the cooling chamber 44 of the cooling tower 10 (step 412). During operation of the exhaust fan 26, the recirculating media 56 that has been delivered to the cooling tower 10 is cooled by the control air 40 within the cooling chamber 44 of the cooling tower 10 (step 414). The recirculating media 56, once cooled, is then returned to the manufacturing facility 12 to repeat this cooling process (step 416).

The industrial heat exchange system 20 for maintaining a temperature of the cooling tower 10, as discussed above, can be used within a wide range of manufacturing applications. Such applications can include, but are not limited to, plastic injection molding apparatus and other plastics manufacturing, metal forming apparatus and other metal manufacturing, foundries, assembly plants, and other similar energy generation, processing, manufacturing and assembly facilities. In addition, heat 14 for maintaining the temperature of the control air 40 can be recaptured from the various manufacturing and energy generation mechanisms of the manufacturing facility 12. Heat 14 can also be recaptured from refrigeration units and other air conditioning units 100, such as condensers 102 and other heat exchangers. Heat 14 for managing the temperature of the control air 40 can also be received from dedicated heaters that may be gas-powered, electric or powered through an alternative energy source.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An industrial heat exchange system comprising:
a cooling tower having an exterior wall and a top aperture;
an exhaust fan positioned near the top aperture, wherein a mixing space of the cooling tower is positioned below the exhaust fan;
an ambient air inlet that extends through the exterior wall for providing outside air into the mixing space; and
a manufacturing air inlet that extends through the exterior wall for providing heated air into the mixing space, wherein the outside air and the heated air combine within the mixing space to define control air that is maintained above a minimum temperature, wherein the heated air is delivered through an air duct extending from a manufacturing facility to the manufacturing air inlet.

2. The industrial heat exchange system of claim 1, wherein the mixing space is positioned within the exterior wall.

3. The industrial heat exchange system of claim 1, wherein the mixing space includes a first mixing space disposed within the exterior wall and a second mixing space positioned outside of the exterior wall.

4. The industrial heat exchange system of claim 1, wherein the cooling tower includes a fluid spray system that injects heated fluid from the manufacturing facility to prevent freezing of the cooling tower.

5. The industrial heat exchange system of claim 1, wherein the heated air from the manufacturing facility is generated within at least one of an injection molding apparatus and a metal forming apparatus.

6. The industrial heat exchange system of claim 5, wherein the heated air from the manufacturing facility is at least partially heated by at least one of an injection molding apparatus, a metal forming apparatus, a condenser for an air conditioning unit and a dedicated heater.

7. The industrial heat exchange system of claim 6, wherein the heated air is selectively heated by the dedicated heater, wherein the dedicated heater is a gas-powered heater.

8. The industrial heat exchange system of claim 1, wherein the manufacturing air inlet includes an airflow device that regulates an amount of the heated air that is directed to the mixing space.

9. The industrial heat exchange system of claim 8, wherein the cooling tower includes a plurality of thermostats that are in communication with the airflow device of the manufacturing air inlet.

10. The industrial heat exchange system of claim 1, wherein the cooling tower operates to cool a recirculating media that is delivered between the manufacturing facility and a cooling chamber of the cooling tower.

11. The industrial heat exchange system of claim 10, wherein the cooling chamber is positioned between the mixing space and the exhaust fan.

12. The industrial heat exchange system of claim 10, wherein the recirculating media captures heat from the manufacturing facility, wherein the heat is transferred from the recirculating media to the control air within the cooling tower.

13. An industrial heat exchange system comprising:
a cooling tower having an exterior wall and a top aperture;
an exhaust fan positioned within the exterior wall, wherein at least one mixing space is positioned upstream of the exhaust fan;
a manufacturing air inlet that extends through the exterior wall for providing heated air into the at least one mixing space; and
an ambient air inlet in communication with at least the heated air for selectively providing outside air into the at least one mixing space, wherein the outside air and the heated air combine within the at least one mixing space to define control air that is maintained above a minimum temperature, wherein the heated air is delivered through an air duct extending from a manufacturing facility to the manufacturing air inlet.

14. The industrial heat exchange system of claim 13, wherein an external mixing space is positioned outside of the exterior wall, and wherein the outside air and the heated air are delivered to the external mixing space to define the control air and the control air is introduced into the cooling tower via the manufacturing air inlet.

15. The industrial heat exchange system of claim 13, wherein the cooling tower operates to cool a recirculating media that is delivered between the manufacturing facility and a cooling chamber of the cooling tower, wherein the cooling chamber is positioned between the at least one mixing space and the exhaust fan, and wherein the recirculating media captures heat from the manufacturing facility, wherein the heat is transferred from the recirculating media to the control air within the cooling tower.

16. The industrial heat exchange system of claim 13, wherein the cooling tower includes a fluid spray system that injects heated fluid from the manufacturing facility to prevent freezing of the cooling tower.

17. The industrial heat exchange system of claim 13, wherein the manufacturing air inlet includes an airflow device that regulates an amount of the heated air that is directed to the at least one mixing space, and wherein the cooling tower includes a plurality of thermostats that are in communication with the airflow device of the manufacturing air inlet.

18. An industrial heat exchange system comprising:
a cooling tower having an exterior wall and a top aperture;
an exhaust fan positioned proximate the top aperture, wherein at least one mixing space is positioned within the exterior wall and upstream of the exhaust fan;
a manufacturing air inlet that extends through the exterior wall for providing heated air that is expelled from mechanical equipment, wherein the heated air is directed into the at least one mixing space; and
an ambient air inlet in communication with at least the heated air for selectively providing outside air into the at least one mixing space, wherein the outside air and the heated air combine within the at least one mixing space to define control air that is maintained above a minimum temperature, wherein the heated air is delivered through an air duct extending from a manufacturing facility to the manufacturing air inlet.

19. The industrial heat exchange system of claim 18, wherein the cooling tower operates to cool a recirculating media that is delivered between the manufacturing facility and a cooling chamber of the cooling tower, wherein the cooling chamber is positioned between the at least one mixing space and the exhaust fan, and wherein the at least one mixing space is positioned within the exterior wall.

20. The industrial heat exchange system of claim 19, wherein the manufacturing air inlet includes an airflow device that regulates an amount of the heated air that is directed to the at least one mixing space, and wherein the cooling chamber of the cooling tower includes a plurality of thermostats that are in communication with the airflow device of the manufacturing air inlet.

* * * * *